C. KIRCHHOF.
CANDLE HOLDER.
No. 9,912. Reissued Oct. 25, 1881.
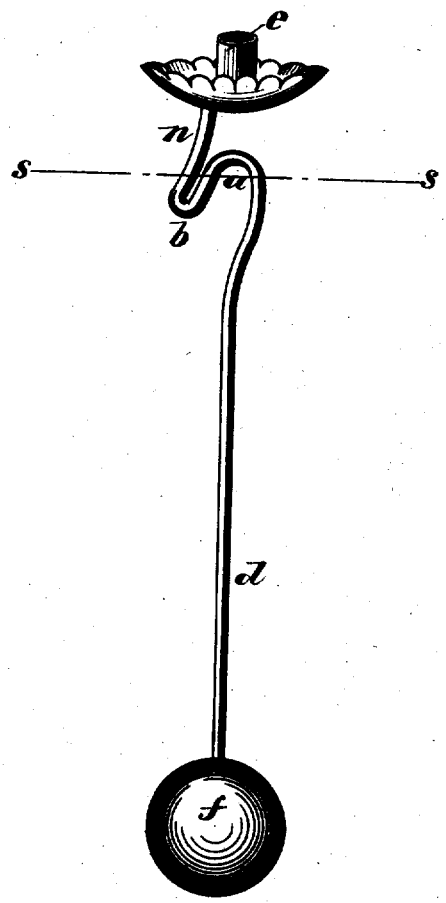
WITNESSES
E. L. Nottingham.
Herman Moran.
INVENTOR
Charles Kirchhof.
By H. A. Seymour.
ATTORNEY
N. PETERS, Photo-Lithographer, Washington, D. C.

UNITED STATES PATENT OFFICE.

CHARLES KIRCHHOF, OF NEWARK, NEW JERSEY.

CANDLE-HOLDER.

SPECIFICATION forming part of Reissued Letters Patent No. 9,912, dated October 25, 1881.

Original No. 72,506, dated December 24, 1867; Reissue No. 6,805, dated December 14, 1875; Reissue No. 7,652, dated May 1, 1877.
Application for reissue filed September 10, 1881.

*To all whom it may concern:*

Be it known that I, CHARLES KIRCHHOF, of Newark, in the county of Essex and State of New Jersey, have invented a new and useful Improvement in Candle-Holders for Christmas-Trees, of which the following is a specification, reference being had to the accompanying drawing.

The nature of my invention consists in the construction of an arrangement for conveniently attaching the candles or ornaments or other objects to and maintaining them above the oscillating branches of the tree in their proper position.

I will now proceed to describe my construction and operation.

The construction of my device is based upon the principle of a counterbalanced pendulum.

A hook, *a b*, as shown in the drawing, and made of the required material, may be so arranged as to be conveniently attached, either by the curved part *a* or the point *b*, to the supporting-branch *s s* and easily removed again. To this hook is attached the candle-holder *e*, or any other object desired, either by means of the short part *n*, extending upward, as shown in the drawing, or in any other suitable manner allowing the proper operation. The hook *a b* is also provided with the rod *d*, to the lower end of which may be attached, in a suitable manner, the weight *f*, which may consist of a ball, fruit, or any other object of sufficient gravity for successful operation.

It is obvious that my improvement may consist of one or more pieces of a variety of materials, if arranged in substantially the manner above described.

Having fully described my invention, what I claim as new, and desire to secure by Letters Patent, is—

1. A candle-holder provided with an attaching device, and a depending rod having a weight attached to its lower end, the parts being constructed to cause the weight to retain the candle in an upright position when the holder is suspended by its attaching device, substantially as set forth.

2. A candle-holder having a depending rod attached thereto, a portion of said rod constituting a hook, and a weight attached to the lower end of the rod, the parts being constructed to cause the weight to retain the candle in an upright position when the holder is suspended by its attaching-hook, substantially as set forth.

3. As a new article of manufacture, a candle-holder having a depending rod connected therewith, a weight attached to the lower end of the rod, and an attaching device located between the weight and candle-holder, the parts being constructed to cause the weight to retain the candle in an upright position when the holder is suspended by its attaching device, substantially as set forth.

In testimony that I claim the foregoing I have hereunto set my hand.

CHARLES KIRCHHOF.

Witnesses:
AUGUST HUNGER.
FRED VENUS.